United States Patent [19]
Dyke

[11] Patent Number: 6,071,413
[45] Date of Patent: Jun. 6, 2000

[54] PROCESS FOR REMOVING ORGANIC AND INORGANIC CONTAMINANTS FROM PHENOLIC STRIPPED SOUR WATER EMPLOYING REVERSE OMOSIS

[75] Inventor: Charles A. Dyke, Glenham, N.Y.

[73] Assignee: Texaco Inc., White Plains, N.Y.

[21] Appl. No.: 09/229,854

[22] Filed: Jan. 13, 1999

[51] Int. Cl.$^7$ .............................. B01D 61/00; C02F 1/44
[52] U.S. Cl. .................. 210/651; 210/652; 210/669; 210/703; 210/806; 210/807; 210/912
[58] Field of Search ....................... 210/651, 652, 210/663, 665, 669, 688, 696, 703, 704, 705, 737, 806, 807, 904, 912, 687; 208/252, 251 R

[56] References Cited

U.S. PATENT DOCUMENTS

| | | |
|---|---|---|
| 4,678,584 | 7/1987 | Elfline . |
| 4,915,928 | 4/1990 | Marcantonio . |
| 4,971,702 | 11/1990 | Renk . |
| 5,250,185 | 10/1993 | Tao et al. ................. 210/654 |
| 5,322,600 | 6/1994 | Spitz et al. . |
| 5,376,262 | 12/1994 | Perry ....................... 210/651 |
| 5,453,201 | 9/1995 | Etzel et al. . |
| 5,545,330 | 8/1996 | Ehrlich .................... 210/703 |
| 5,591,346 | 1/1997 | Etzel et al. . |
| 5,603,838 | 2/1997 | Misra et al. . |

*Primary Examiner*—Matthew O. Savage
*Assistant Examiner*—Richard W. Ward
*Attorney, Agent, or Firm*—Harold J. Delhommer; Dilworth & Barrese

[57] ABSTRACT

A reverse osmosis process for treating a phenolic stripped sour water stream containing soluble and insoluble contaminants is provided. Prior to passage through a reverse osmosis membrane, the phenolic stripped sour water stream is cooled, subjected to air flotation and filtered through a sand filtration system to remove insoluble contaminants, and passed through a water softener to remove divalent and trivalent metal cation contaminants. The pH of the stream is adjusted prior to the water softener, and again prior to the reverse osmosis membrane, to stabilize the solubility of soluble organic contaminants present within the stream.

14 Claims, 1 Drawing Sheet

PROCESS FOR REMOVING ORGANIC AND INORGANIC CONTAMINANTS FROM PHENOLIC STRIPPED SOUR WATER EMPLOYING REVERSE OMOSIS

BACKGROUND OF THE INVENTION

This invention relates to a process for removing organic and inorganic contaminants from phenolic stripped sour water. More particularly, this invention is directed to a process for removing inorganic contaminants such as selenium from phenolic stripped sour water employing reverse osmosis and appropriate pH adjustments.

A refinery wastewater stream in a refinery wastewater treatment unit is typically formed from the combination of wastewater streams present within the refinery unit. The refinery wastewater stream will ordinarily contain many regulated organic and inorganic contaminants present therein which can be recognized as a biological and health hazard. Standards promulgated by federal and state agencies restricting the amount of the contaminants and, in particular, the amount of selenium, present in the refinery wastewater stream prior to the stream being disposed into publicly owned treatment works or discharged into waste injection wells have been imposed.

Phenolic stripped sour water is one such wastewater stream present within the refinery unit used to form the refinery wastewater stream. The sour water typically has a high content of selenium, e.g., of up to at least 65 percent of the total selenium content present within the refinery wastewater stream. Processes for removing selenium from wastewater streams have been employed. See, e.g., U.S. Pat. Nos. 4,678,584; 4,915,928; 4,971,702; 5,322,600; 5,453,201; 5,591,346 and U.S. Pat. No. 5,603,838. However, since the greatest concentration of selenium is in the phenolic stripped sour water, processes for reducing the concentration of selenium in phenolic stripped sour water need to be employed to reduce the amount of selenium in the sour water prior to it being combined with the other wastewater streams to form the refinery wastewater stream.

SUMMARY OF THE INVENTION

In accordance with the present invention, a process for treating phenolic stripped sour water containing soluble and insoluble organic and inorganic contaminants including selenium and divalent and trivalent metal cations to reduce the concentration of selenium present therein is provided which comprises:

a) passing the phenolic stripped sour water through a cooling system to decrease the temperature of the phenolic stripped sour water and provide a cooled phenolic stripped sour water;

b) passing the cooled phenolic stripped sour water through an air flotation system to remove insoluble contaminants present therein not greater than about 1.0 micron in size and provide a flotation phenolic stripped sour water;

c) passing the flotation phenolic stripped sour water through a sand filtration system to remove any remaining insoluble contaminants present therein greater than about 1.0 micron in size and provide a filtered sour water;

d) subjecting the filtered sour water to a first pH adjustment to stabilize the solubility of the soluble organic contaminants and provide a pH adjusted filtered sour water;

e) passing the pH adjusted filtered sour water through a softener to remove divalent and trivalent metal cations present therein and provide a reverse osmosis sour water;

f) subjecting the reverse osmosis sour water to a second pH adjustment to restabilize the solubility of the soluble organic contaminants and provide a pH adjusted reverse osmosis sour water; and g) passing the pH adjusted reverse osmosis sour water into contact with the high pressure side of a reverse osmosis membrane to remove any selenium present therein and recover from the low pressure side of the reverse osmosis membrane a reverse osmosis permeate having a reduced concentration of selenium.

The use of a reverse osmosis membrane accompanied by appropriate pH adjustments in accordance with the foregoing process provides a phenolic stripped sour water possessing significantly reduced levels of selenium prior to the phenolic stripped sour water being combined with other wastewater streams present in a refinery wastewater treatment unit to form a refinery wastewater stream.

DESCRIPTION OF THE PREFERRED EMBODIMENTS

Figure 1:
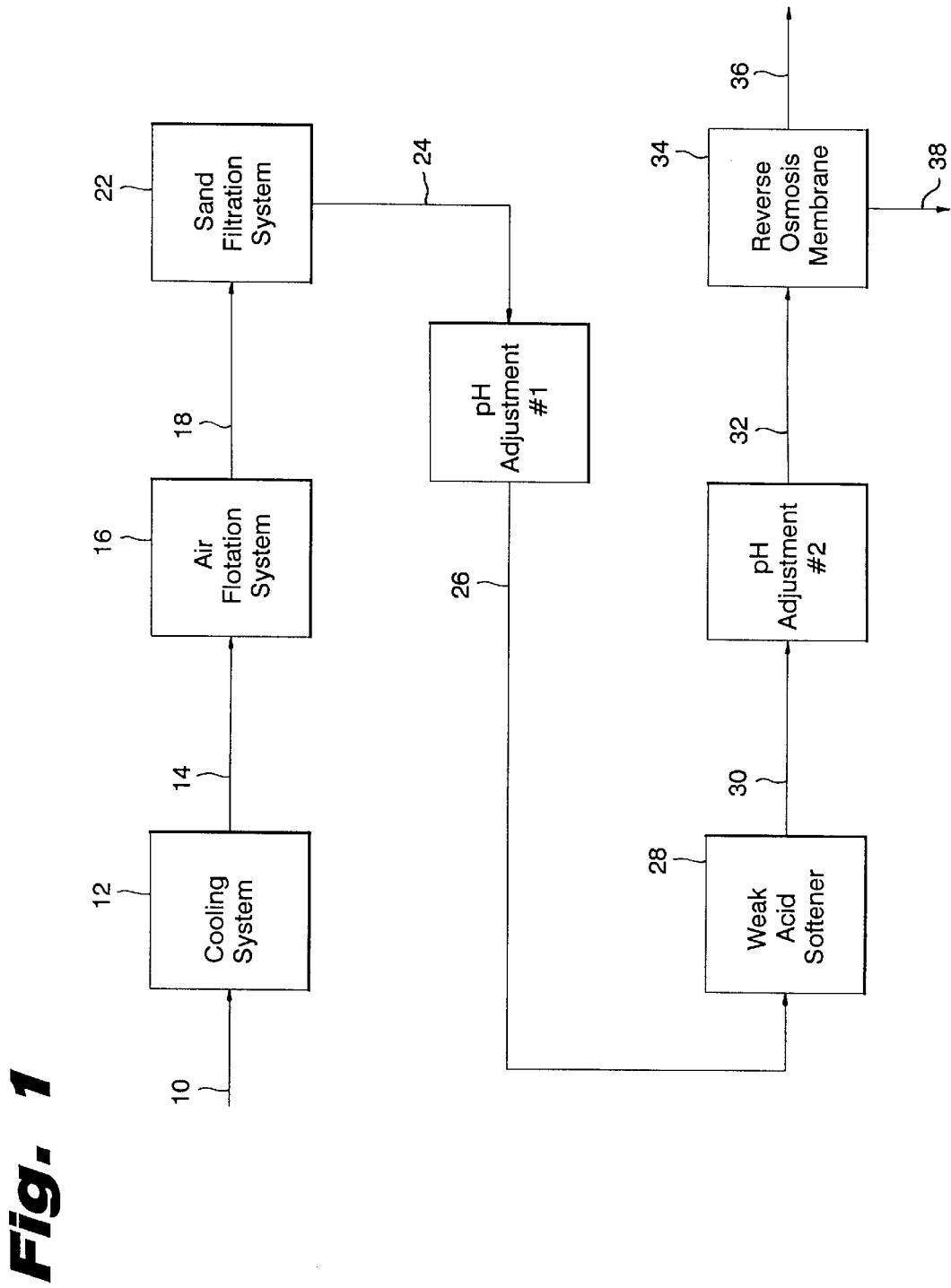
FIG. 1 is a flowchart showing the process of the invention.

With reference to FIG. 1, phenolic stripped sour water 10 of this invention will typically contain organic and inorganic contaminants. The organic contaminants can be, for example, dissolved and emulsified hydrocarbons such as benzene, ethylbenzene, toluene, xylene, phenol and the like. The inorganic contaminants can be, for example, salts such as sodium chloride, sodium sulfate, calcium chloride, calcium carbonate, calcium phosphate, barium chloride, barium sulfate and the like, gases such as hydrogen sulfide, ammonia and the like, metals such as copper, nickel, lead, zinc, arsenic, tantalum, selenium, fluorine, molybdenum, barium, iron, cobalt, tungsten, cadminium, strontium, vanadium, magnesium, chromium, mercury, boron and the like and oxides. The organic and inorganic contaminants will ordinarily be in soluble and insoluble form. In general, the phenolic stripped sour water will have a substantially high concentration of phenol and selenium. The concentration of phenol in the phenolic stripped sour water 10 will ordinarily range from about 190 mg/L to about 200 mg/L and the concentration of selenium in the phenolic stripped sour water 10 will ordinarily range from about 5.0 mg/L to about 5.7 mg/L.

The temperature of the phenolic stripped sour water 10 is typically at a high temperature, e.g., at a temperature greater than about 150° F. Accordingly, it is necessary to reduce the temperature of the phenolic stripped sour water 10 at the beginning of the process used herein to prevent the fouling of, as described below, the reverse osmosis membrane. The phenolic stripped sour water 10 can be cooled by passing it through cooling system 12 to provide a cooled phenolic stripped sour water 14. Cooling systems are well known in the art and can be, for example, a heat exchanger. The cooling system 12 will ordinarily reduce the temperature of the cooled phenolic stripped sour water to a temperature of about 100° F. to about 125° F. and preferably from about 105° F. to about 115° F.

The cooled phenolic stripped sour water 14 is then passed through air flotation system 16 to advantageously remove insoluble contaminants and/or oil droplets present therein and provide flotation stripped sour water 18. Air flotation systems are known and any commercially available air flotation system can be used herein.

Optionally, the flotation stripped sour water 18 can be passed to a surge tank. Surge tanks are well known in the art and any commercially available surge tank can be used. In general, a surge tank can control the flow of the flotation stripped sour water 18 through the process used herein so that when, as described below, the amount of pH adjusted reverse osmosis sour water being passed through the reverse osmosis membrane is in an amount that the reverse osmosis membrane can ordinarily process.

The flotation stripped sour water 18 is passed through sand filtration system 22 to remove any remaining insoluble contaminants and/or oil droplets present therein employing, for example, a sandfilter. The use of sandfilters are well known in the art and any commercially available sand filter can be used herein. A preferred sandfilter system for use herein is the duplex multi-media sandfilter system available from U.S. Filter Corp. In general, the sand filtration system 22 will remove insoluble contaminants and/or oil droplets of at least about 1 micron in size or larger to provide a filtered sour water 24. The sandfilter used herein can ordinarily be cleaned by periodically employing a backwashing fluid to readily loosen and solubilize any trapped contaminants and/or oil droplets from the sandfilter's sand beds. It is particularly advantageous to use the reverse osmosis permeate, which is discussed below, as the backwashing fluid since it has a high pH, e.g., a pH greater than about 9, and will typically result in a thorough cleaning of the sand beds. The sandfilter can then continue to operate with a typically low sand bed pressure drop.

Following the filtering of any remaining insoluble contaminants and/or oil droplets from the flotation stripped sour water 18, it is necessary to adjust the pH level of the filtered sour water 24 upwards to stabilize the soluble organic contaminants present therein. The pH of the filtered sour water 24 can be adjusted by the addition of hydroxides of alkali metals such as, for example, sodium hydroxide, into the filtered sour water. Sodium hydroxide is preferred for use herein. The amount of sodium hydroxide added to the filtered sour water 24 will ordinarily range from about 0.005 to about 0.02 pounds of 50% NaOH brine per gallon of the filtered sour water 24. The pH of the filtered sour water 24 will ordinarily be increased from about 0.5 pH units to about 2.5 pH units and preferably from about 1.0 pH units to about 2.0 pH units, to provide a pH adjusted filtered sour water 26. Thus, the pH of the pH adjusted filtered sour water 24 can range from about 8.5 to about 9.2 and preferably from about 8.8 to about 9.0.

Following the adjustment of the pH level of the filtered sour water 24, it is necessary to remove any divalent cations, e.g., barium, calcium, iron, magnesium and the like, and/or trivalent cations present in the pH adjusted filtered sour water 26 by subjecting sour water 26 to softener 28. It is especially advantageous to remove any calcium and magnesium cations present therein so that when, as described below, the pH adjusted reverse osmosis sour water is passed through the reverse osmosis membrane, the calcium-based and magnesium-based mineral scales do not precipitate on and foul the reverse osmosis membrane. Zeolite softeners, weak acid softeners, organic chelating agents such as ethylenediamine-tetraacetic acid (EDTA), hydroxyethylethylenediaminetriacetic acid (HEDTA), nitrilotriacetic acid (NTA), N-dihydroxyethylglycine, ethylene bis (hydroxyphenylglycine) (EHPG) and the like; combinations thereof, or other softening procedures can be used to remove the divalent and/or trivalent cations. Weak acid softeners are preferred for use herein. Suitable weak acid softeners can be any commercially available weak acid softener known to one skilled in the art such as those available from U.S. Filter Corp. Scale inhibitors can also be added to further reduce the possibility of scaling.

In general, the pH adjusted filtered sour water 26 is passed through weak acid softener 28 to remove any divalent and/or trivalent cations present therein and provide a reverse osmosis sour water 30. The concentration level to which the divalent and/or trivalent cations are reduced in the reverse osmosis sour water 30 can vary, e.g., in the case of calcium can range to a level of less than about 0.1 mg/L to less than about 0.01 mg/L and in the case of magnesium can range to a level of less than about 0.1 mg/L to less than about 0.01 mg/L.

Any remaining soluble organic contaminants present in the reverse osmosis sour water 30 would typically result in the fouling of the reverse osmosis membrane, as described below, when passed through the reverse osmosis membrane. Accordingly, it is necessary to adjust the pH of the reverse osmosis sour water 30, e.g. to a pH level ranging from about 9.5 to about 11.0 and preferably from about 10.1 to about 10.5 to restabilize the soluble organic contaminants and provide a pH adjusted reverse osmosis sour water 32. The pH of the reverse osmosis sour water 30 can be adjusted by the addition of hydroxides or alkali metals, such as, for example, sodium hydroxide, into the reverse osmosis feedwater 30. Sodium hydroxide is preferred for use herein. Generally, the amount of sodium hydroxide will range from about 0.005 to about 0.02 pounds of 50% NaOH brine per gallon of the reverse osmosis sour water 30.

The pH adjusted reverse osmosis sour water 32 is then passed into contact with the high pressure side of reverse osmosis membrane 34 to remove any soluble contaminants present therein and recover from the low pressure side of the reverse osmosis membrane 34 a reverse osmosis permeate 36 and from the high pressure side of the membrane 34 a reverse osmosis retentate 38. It is particularly advantageous to remove selenium from the pH adjusted reverse osmosis feedwater 32. The reverse osmosis membrane 34 of this invention can be obtained employing methods known in the art. The membrane 34 can be a thin film composite membrane possessing a relatively thick, nonwoven fabric backing layer, a porous ultrafiltration membrane as an intermediate layer and a dense non-porous polymeric film as a separation layer. The reverse osmosis membrane 34 that can be used herein is commercially available from Desalination Systems, Inc. (Escondido, Calif.). The reverse osmosis membrane 34 will ordinarily have a sodium chloride rejection of about 97.5 to about 99.9 percent.

In general, the reverse osmosis membrane 34 can be formed into any suitable configuration such as a flat sheet, hollow fiber and the like, employing known methods. As one skilled in the art will readily appreciate, the flat sheet can be further formed into a configuration such as a spiral wound module or a plate-and-frame. A preferred configuration for use herein is the spiral wound module. The reverse osmosis membrane 34 possessing a spiral wound module configuration used herein will ordinarily have a diameter of about 8 inches and a length of about 40 inches. The reverse osmosis membrane 34 can typically process about 5 gallons/minute of pH adjusted reverse osmosis sour water 32 at a pressure differential maintained across the membrane 34 from about 200 to about 1,000 psig. A full scale operation can use multiple larger membranes having a commercially available diameter of at least about 8 inches and a length of at least about 60 inches. The reverse osmosis membrane 34 at full scale operation can ordinarily process about 7.5 gallons/minute of pH adjusted reverse osmosis sour water 32 at a pressure differential of from about 200 to about 1,000 psig.

The reverse osmosis permeate 36 recovered from the low pressure side of the reverse osmosis membrane 34 is reduced in concentration of selenium. The concentration of selenium still present in the reverse osmosis permeate 36 can range, e.g., from about 0.01 to about 0.1 and preferably below about 0.05. The turbidity of the reverse osmosis permeate 36 will ordinarily be less than about 0.2 NTU and preferably less than about 0.1 NTU. The percentage of the phenolic stripped sour water 10 recovered as the reverse osmosis permeate 36 can be from about 50 to about 90 percent, preferably from about 70 to about 85 percent and more preferably from about 75 to about 80 percent. The reverse osmosis permeate 36 can then be combined with other wastewater streams present in the treatment unit to form a refinery wastewater stream. The reverse osmosis retentate 38 can be sent back to the beginning of the process described herein and combined with the phenolic stripped sour water 10.

The following example is illustrative of the process of this invention.

EXAMPLE

A demonstration unit which included the process of this invention was set up to process a phenolic stripped sour water at Texaco's Bakersfield Refinery (BkP). The goal of the treatment process was to remove selenium from the refinery's phenolic stripped sour water (PhSSW) stream such that the reverse osmosis permeate recovered at the end of the treatment process, when added to the refinery's overall wastewater stream, resulted in a major, overall reduction of selenium in the wastewater and the wastewater met or exceeded new standards being proposed at the beginning of the test period for injection into Class V (non-hazardous) disposal wells in California. The proposed selenium limit was 1.0 mg/L.

Operating and analytical data from an initial pilot test, conducted between June, 1994 and December, 1994, and a 25-day demonstration test of the process conducted between March, 1995, and June, 1995, were used to substantiate the process of the invention.

The demonstration unit performed all of the steps of the invention except for the air flotation step. The air flotation system for this step was studied in the laboratory under the direction of the inventor. Tests showed that sparingly soluble contaminants in the PhSSW could be precipitated out of solution if the PhSSW was exposed to air and agitated. Therefore, it is believed that the air flotation system would improve the operation of the overall process by precipitating these contaminants, which would then be removed by the sand filtration system so they would not be present to possibly foul downstream equipment in the process. Nonetheless, the tested process, without the air flotation system, demonstrated and proved all the claims of the invention.

In the demonstration test, the temperature of the PhSSW was decreased to about 110° F. by a cooling system to provide a cooled PhSSW. The cooled PhSSW then flowed continuously through one of two multi-media (MM) sand-filters where substantial amounts of insoluble organic and inorganic contaminants were removed by the filter's sand bed. At the end of each 12 hours of operation, the cooled PhSSW was diverted to the alternate filter while the dirty filter was valved out and cleaned by pumping a portion of the reverse osmosis permeate, stored for that purpose, upwards through the sand bed (backwashing) for about 15 minutes to remove any filtered contaminants trapped on the sand. The dirty backwash was pumped back to the refinery's wastewater storage tanks. The total volume of backwash used, including rinsing, was about 3.5% of the flow of the PhSSW. This procedure was repeated alternately with each filter.

The sandfilters removed substantially all of the insoluble oil and solid contaminants in the cooled PhSSW to provide a filtered sour water. The turbidity of the filtered soft water was typically below 1.0 NTU (nephelometric turbidity units), and was usually below 0.5 NTU. The filtered sour water was then subjected to a pH adjustment increase to about 9.0 to stabilize sparingly soluble organics and provide a pH adjusted filtered sour water. The pH adjusted sour water was then sent to a dual weak-acid (WA) softener system to reduce the concentration of its hardness ions, e.g., calcium, magnesium and other divalent cations to provide a reverse osmosis sour water. The calcium hardness of the reverse osmosis sour water was reduced to below 0.10 mg/L. If not removed, the calcium could have precipitated as calcium carbonate from the sour water as it was being concentrated in the reverse osmosis membrane at a high pH. The WA softeners were regenerated as needed with 5% HCl and 4% NaOH solutions made with reverse osmosis permeate. Additional filtration also occurred in these softeners, such that the turbidity of the reverse osmosis sour water average 0.2 NTU.

A controlled flow of a 16.3% NaOH (in reverse osmosis permeate) solution was injected into the reverse osmosis sour water to raise and control the pH of the reverse osmosis sour water to about 10.0 to about 10.2 to provide a pH adjusted reverse osmosis sour water. Nalco 7280 scale inhibitor was injected into the pH adjusted reverse osmosis sour water at a rate of about 4.0 mg/L of sour water as a preventative against any possible scaling. The pH adjusted reverse osmosis sour water entered the reverse osmosis membrane and about 80% of the sour water was recovered as reverse osmosis permeate. The pH of the pH adjusted sour water naturally dropped as it was being processed with reverse osmosis permeate being removed therefrom. The reverse osmosis membrane contained a second 16.3% NaOH injection system that raised the pH after about 44% of the reverse osmosis permeate had been removed, so that the permeate was being maintained at a pH between about 10.0 and about 10.2. The total amount of NaOH used averaged 0.011 pounds of 50% NaOH per 1 gallon of the pH adjusted reverse osmosis sour water. Operating at this elevated pH greatly increased the solubility of the soluble organic contaminants still remaining in the water, which kept them from precipitating as their concentrations increased during reverse osmosis processing.

A small internal recycle stream of reverse osmosis retentate recovered from the reverse osmosis membrane was diverted back into the pH adjusted reverse osmosis sour water (not shown explicitly in FIG. 1) so that the flow of the sour water to the reverse osmosis membranes could be kept constant and independent of the permeate recovered. The reverse osmosis membrane feed operating pressure required for 110° F. and a flux of 9 gallons/sq. ft.-day was about 605 psig.

The recovered reverse osmosis permeate had over 98% of its selenium removed. Specifically, the selenium (measured by atomic adsorption) in the PhSSW was reduced from an average concentration of about 5.55 mg/L to an average concentration of about 0.07 mg/L in the reverse osmosis permeate. Selenium measured by the TCLP test was reduced from about 5.3 mg.L to less than about 0.01 mg/L, the imposes measurement limit of this test. Other contaminants reduced in the process used herein the following: total organic carbon was reduced from about 1457 to about 70 mg/L and total sulfides were reduced from about 103 to about 2.4 mg/L. This stream of recovered reverse osmosis permeate was considered clean enough to be recycled back into the refinery's process water system.

The reverse osmosis membrane was cleaned periodically with a commercially-available high pH membrane cleaning solution, followed by a rinse with the reverse osmosis permeate.

A separate proprietary process was then tested on the reverse osmosis reject to remove concentrated selenium from it. This is essential to reduce the refinery's final wastewater selenium level. Selenium in the reject was reduced from an average of about 24.5 to about 0.64 mg/L. The selenium was removed as a precipitated sludge. The remaining reject would be treated in the refinery's wastewater treatment system. The overall reduction in the selenium in the PhSSW sent to the refinery's wastewater treatment plant as a result of the invention and the separate proprietary process running simultaneously was over 96%.

Invention Demonstration Test (March–April 1995)
80% RECOVERY-pH 10.1-DESAL SC2540FXP

| Contaminant | PhSSW | RO Feed | Retentate to Precip | Permeate to Reuse |
|---|---|---|---|---|
| Sodium | 161.0 | 313.3 | 2401.0 | 39.9 |
| Calcium | 10.0 | <.05 | 0.24 | <0.05 |
| Phosphate | 10.0 | 9.7 | 27 | 5.3 |
| Silica | 10.8 | 0.0 | 0.0 | 0.0 |
| Magnesium | 0.06 | <0.01 | 0.07 | <0.01 |
| Cl- | 21.6 | 23.0 | 105.1 | 2.4 |
| $HCO_3$- (1) | 593.7 | 179.6 | 667.0 | 0.0 |
| $CO_3$= (1) | 200.4 | 1080.6 | 3725.0 | 115 |
| OH- (1) | 0.0 | 0.0 | 0.0 | 725 |
| $SO_4$= | <2.0 | <2.0 | 0.0 | <2.0 |
| Sulfides | 18.0 | 18.0 | 87.4 | 0.6 |
| Arsenic | 0.002 | 0.002 | 0.007 | <0.002 |
| Barium | <0.010 | <0.010 | <0.010 | <0.010 |
| Boron | 0.0 | 1.123 | 1.615 | 1.000 |
| Chromium | 0.015 | 0.015 | 0.0 | <0.010 |
| Iron | 0.054 | <0.060 | 0.290 | <0.050 |
| Mercury | <0.0002 | <0.0002 | <0.0002 | <0.0002 |
| Molybdenum | <0.050 | <0.050 | <0.050 | <0.050 |
| Selenium | 5.550 | 5.199 | 25.640 | 0.070 |
| Selenium (TCLP) | 5.300 | 4.750 | 0.0 | <0.010 |
| Strontium | <0.050 | <0.050 | <0.050 | <0.050 |
| Vanadium | <0.050 | <0.050 | <0.050 | <0.050 |
| Zinc | <0.050 | <0.050 | <0.050 | <0.050 |
| Phenols | 194.0 | 194.0 | 848.4 | 29.8 |
| $NH_3$ | 205.0 | 205.0 | 296.7 | 182.0 |
| O&G | 103.3 | 103.3 | 505.3 | 2.4 |
| TOC | 1456.8 | 1456.8 | 6985.9 | 69.5 |
| TDS | 700.0 | 1398.0 | 12130.0 | 157.0 |

(1) Shown as mg/L as $CaCO_3$

What is claimed is:

1. A process for treating phenolic stripped sour water containing soluble and insoluble organic and inorganic contaminants including selenium and divalent and trivalent metal cations to reduce the concentration of selenium therein which comprises:

a) passing the phenolic stripped sour water through a cooling system to decrease the temperature of the phenolic stripped sour water and provide a cooled phenolic stripped sour water;

b) passing the cooled phenolic stripped sour water through an air flotation system to remove insoluble contaminants present therein not greater than about 1.0 micron in size and provide a flotation stripped sour water;

c) passing the flotation stripped sour water through a sand filtration system to remove any remaining insoluble contaminants present therein greater than about 1.0 micron in size and provide a filtered sour water;

d) subjecting the filtered sour water to a first pH adjustment to stabilize the solubility of the soluble organic contaminants and provide a pH adjusted sour water;

e) passing the pH adjusted sour water through a softener to remove divalent and trivalent metal cations present therein and provide a reverse osmosis sour water;

f) subjecting the reverse osmosis sour water to a second pH adjustment to restabilize the solubility of the soluble organic contaminants and provide a pH adjusted reverse osmosis sour water; and, g) passing the pH adjusted reverse osmosis sour water into contact with the high pressure side of a reverse osmosis membrane to remove selenium present therein and recover from the low pressure side of the reverse osmosis membrane a reverse osmosis permeate having a reduced concentration of selenium.

2. The process of claim 1 wherein the temperature of the cooled phenolic stripped sour water is about 105° F. to about 115° F.

3. The process of claim 1 wherein the pH of the filtered sour water is raised by the addition of sodium hydroxide.

4. The process of claim 1 wherein the pH of the pH adjusted filtered sour water is from about 8.5 to about 9.2.

5. The process of claim 1 wherein the softener is selected from the group consisting of weak-acid softener, zeolite softener and organic chelating agent.

6. The process of claim 1 wherein the divalent cations are selected from the group consisting of calcium cations and magnesium cations.

7. The process of claim 6 wherein the divalent cation concentration is reduced to less than about 0.1 mg/L of calcium and less than about 0.1 mg/L of magnesium.

8. The process of claim 1 wherein the pH of the reverse osmosis sour water is raised by the addition of sodium hydroxide.

9. The process of claim 1 wherein the pH of the pH adjusted reverse osmosis sour water is about 10.1 to about 10.5.

10. The process of claim 1 wherein the percentage of the phenolic stripped sour water recovered as the reverse osmosis permeate is about 50 percent to about 90 percent.

11. The process of claim 1 wherein the percentage of the phenolic stripped sour water recovered as the reverse osmosis permeate is about 75 to 80 percent.

12. The process of claim 1 wherein the concentration of selenium in the reverse osmosis permeate is reduced to less than about 0.01 to about 0.1 mg/L.

13. The process of claim 1 wherein the percent rejection for sodium chloride of the reverse osmosis membrane is about 97.5 to about 99 percent.

14. The process of claim 1 wherein the sand filtration system is cleaned with a portion of the reverse osmosis permeate.

* * * * *

UNITED STATES PATENT AND TRADEMARK OFFICE
CERTIFICATE OF CORRECTION

PATENT NO.: 6,071,413

DATED: June 6, 2000

INVENTOR(S): Charles A. Dyke

It is certified that errors appear in the above-identified patent and that said Letters Patent is hereby corrected as shown below:

On the Title Page, Item [54] and Column 1, line 1
In the Title, change "OMOSIS" to --OSMOSIS--.

Column 1, line 4, change "omosis" to --osmosis--.

Column 4, line 22, change "e.g." to --e.g.,--.

Signed and Sealed this

Twenty-seventh Day of March, 2001

Attest:

NICHOLAS P. GODICI

Attesting Officer

Acting Director of the United States Patent and Trademark Office